United States Patent [19]
Merrill et al.

[11] Patent Number: 6,007,081
[45] Date of Patent: Dec. 28, 1999

[54] ADJUSTABLE BICYCLE SAIL APPARATUS

[76] Inventors: Timothy L. Merrill, 380 Brent St., Manchester, N.H. 03103; Michael J. Vitelli, 5 Moran St., Fitchburg, Mass. 01420

[21] Appl. No.: 08/879,388

[22] Filed: Jul. 3, 1997

[51] Int. Cl.[6] .................................................... B62M 1/10
[52] U.S. Cl. ............................................. 280/213; 114/102
[58] Field of Search ................................. 280/213, 810

[56] References Cited

U.S. PATENT DOCUMENTS

| | | | |
|---|---|---|---|
| 578,411 | 3/1897 | Lotherington | 280/213 |
| 639,107 | 12/1899 | Sorenson | 280/213 |
| 3,836,176 | 9/1974 | Ylvisaker | 280/213 |
| 4,418,632 | 12/1983 | Yoshimi et al. | 114/102 |
| 4,441,728 | 4/1984 | Schroeder | 280/213 |
| 5,496,049 | 3/1996 | Escobedo | 280/238 |
| 5,806,451 | 9/1998 | Carn | 280/810 |

*Primary Examiner*—Robert J. Obertleitner
*Assistant Examiner*—Daniel Yeagley
*Attorney, Agent, or Firm*—Davis and Bujold

[57] ABSTRACT

A sail apparatus for a bicycle comprises a pair of sail grids, each having a pivoting mechanism for pivotally attaching a leading edge portion of the sail grids to a frame of the bicycle. A control mechanism, interconnected with the sail grids via a pair of linkage arms, controls the position of the sail grids. A sail is removably secured about each of the sail grids to provide wind resistance. The sail grids are disposed proximate a rear wheel of the bicycle, and, when in a retracted position, are parallel to the rear wheel. For use, a bicyclist actuates the control mechanism, and the sail grids pivot about the pivoting mechanisms out and away from the rear wheel. The sail apparatus further includes a rear sail which has opposed ends thereof connected to second end portions of the sail grids for capturing more air during use of the sail apparatus.

20 Claims, 5 Drawing Sheets

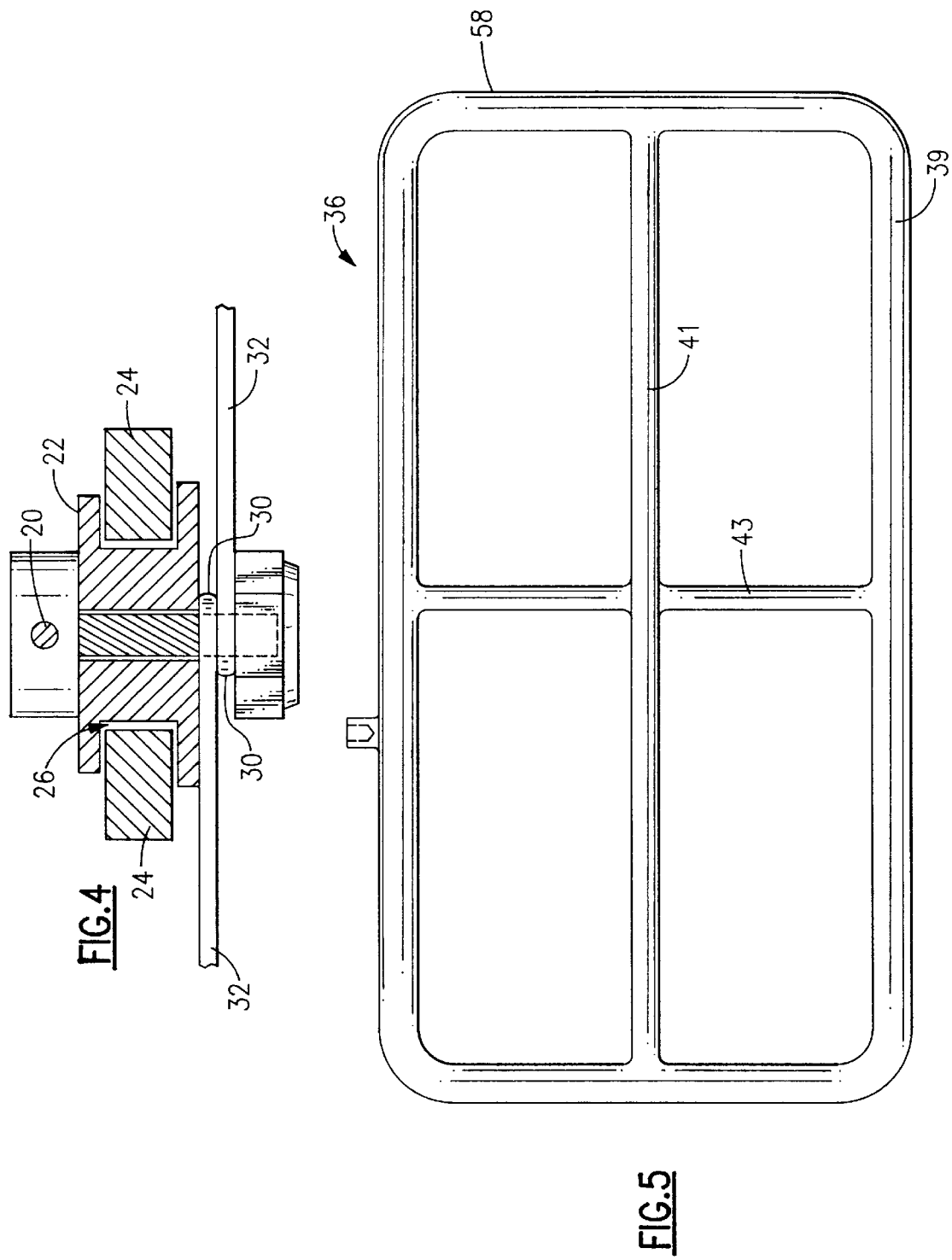

6,007,081

1

ADJUSTABLE BICYCLE SAIL APPARATUS

FIELD OF THE INVENTION

This invention relates to an adjustable sail which is capable of being mounted on particularly, although not exclusively, a bicycle and being operated by the rider. The adjustable sail is used by the rider to utilize wind power to impart either a direct motive force or additional wind resistance to the bicycle.

BACKGROUND OF THE INVENTION

Since the invention of the bicycle in the mid 1800s, humans have utilized this mode of transportation for both industry and recreation and have continued to advance the associated technology. The bicycle has become almost a necessity in the lives of humans around the world, and for good reason, it is one of the most efficient devices ever invented by man. It takes less energy per unit distance covered to move a bicycle then any other machine. Such efficiency comes from the riders use of the large leg muscles in a smooth rotary motion which, when pedaling at sufficient revolutions per unit of time, is a highly efficient use of human power output.

Long before the bicycle, man harnessed the wind as a mode of transportation, discovering that a boat could be efficiently propelled given a reasonably sized and shaped sail to capture the wind along with a hull designed so as to impart a particular vector direction to the boat from the wind force applied across the sails.

Although the use of the wind to produce energy has been and is under constant development, only recently has there been an attempt to utilize wind power as a direct motive force on land vehicles.

One method of utilizing the wind power for vehicles incorporates a sail and rigging highly similar to that of a traditional sail boat attached to specially developed land vehicles such as ice boats and light dune buggies, and while this has achieved a modicum of success in certain areas of the world, the addition of such a sail to a conventional bicycle has hereto been unknown.

Because of the operating conditions under which a cyclist must travel, it is difficult if not impossible to handle a conventional sail as used in a sail boat. The wind direction, wind speed and direction of travel as well as the speed of the cyclist makes orientation and control of the sail critical to successful and efficient use of such a combination. In order to effectively use the combination of wind power as a partial motive force for a bicycle, it is necessary to overcome problems such as control over sail movement and alignment in addition to control of the bicycle without impairing the rider's ability to safely negotiate traffic and variable road conditions.

SUMMARY OF THE INVENTION

It is an object of the invention to provide a supplemental motive force, besides an operator's direct pedaling power, to a bicycle by the use of wind power acting on a sail.

A further object of the invention is to provide a sail which is adjustable depending upon the desire of the rider and the wind and riding conditions where the sail may be stowed in a minimal resistance position or adjusted to take full advantage of prevailing wind conditions and to make such adjustments of the sail through a control mechanism which requires minimal distraction of the rider's attention from the operation of the bicycle.

2

A still further object of the invention is to provide a sail which may be used as a means of increasing the wind resistance of a bicycle for the purpose of increasing the overall riding resistance for race training or obtaining a greater aerobic workout for the rider.

The present invention relates to a sail apparatus for a bicycle, said sail apparatus comprising a pair of sail grids, said pair of sail grids each having a mechanism for pivotally attaching one edge of said sail grid to a frame of a bicycle; a control mechanism for controlling the position of said sail grids; and a pair of linkage arms, each one of said linkage arms being coupled to said control mechanism, at one end thereof, and an opposite end of each one of said pair of linkage arms being coupled to one of said sail grids.

The present invention also relates to a method of utilizing wind while operating a bicycle, said method comprising the steps of providing a pair of sail grids each supporting a sail, pivotally attaching one edge portion of said sail grids to a frame of a bicycle, interconnecting an intermediate portion of each one of said sail grids to a control mechanism via a pair of linkage arms, to control operation of said sail grids; and manipulating said control mechanism to control a position of said sail grids during operation of said bicycle.

BRIEF DESCRIPTION OF THE DRAWINGS

The invention will now be described, by way of example, with reference to the accompanying drawings in which:

FIG. 4 is a diagrammatic partial cross sectional view showing the engagement between the coupling bushing, the operating rod and the grid linkage arms;

FIG. 5 is a diagrammatic front elevational view of one of the sail grids according to the present invention;

DESCRIPTION OF THE PREFERRED EMBODIMENTS

Turning now to FIGS. 1–7 of the drawings, a detailed description concerning the sail apparatus, according to the present invention, will now be provided.

Figure 1:
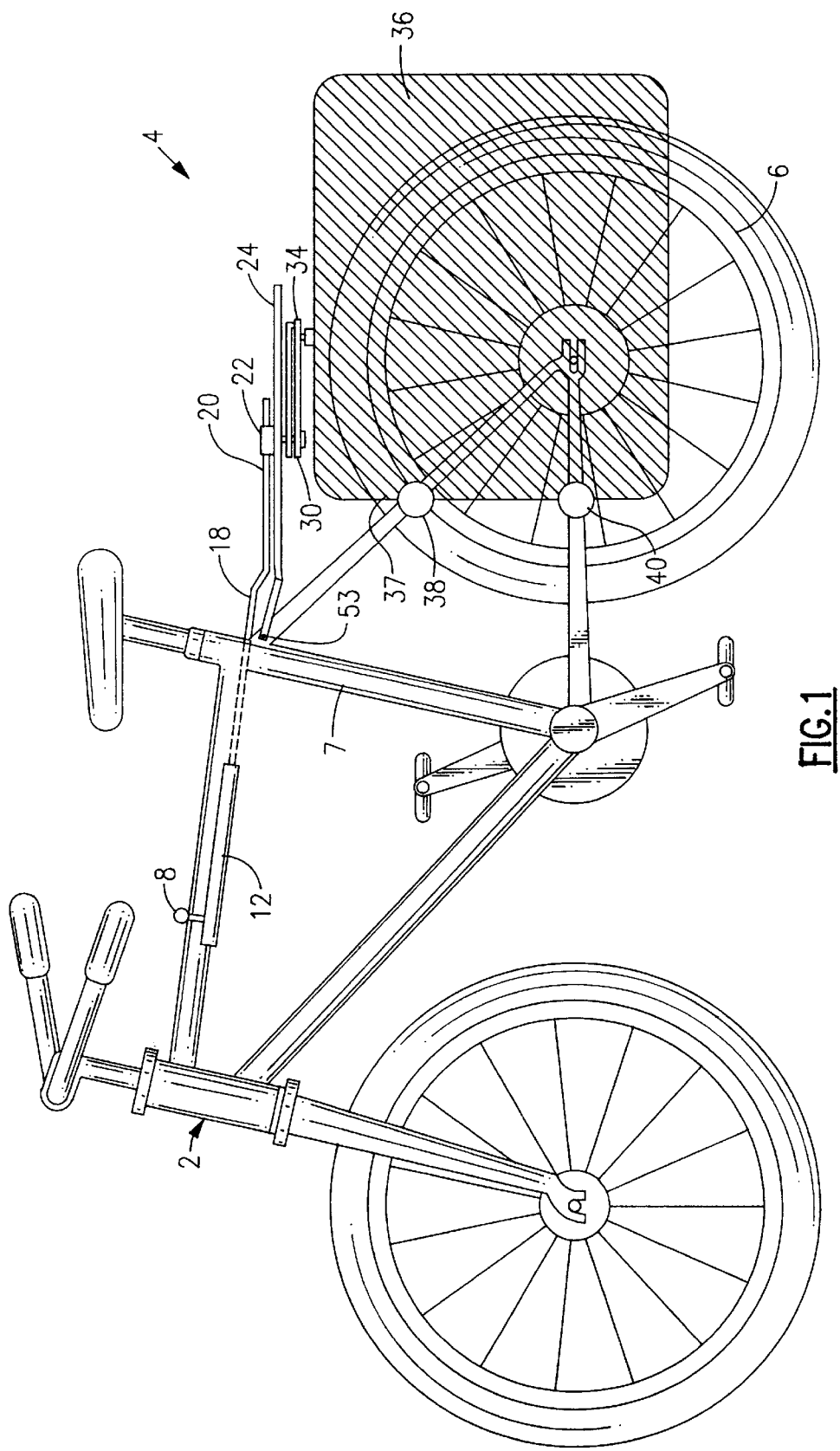
FIG. 1 is a diagrammatic representation of a conventional bicycle carrying the sail apparatus, according to the present invention, having two sails.

As can be seen in FIG. 1, a bicycle is diagrammatically shown by numeral 2. The sail apparatus 4 is mounted adjacent the rear wheel 6 of the bicycle 2. The sail apparatus 4 is attached to a frame 7 of the bicycle 2 and comprises, at a forward end thereof, a control lever 8 attached to the frame 7. The control lever 8 is coupled to an internal slide member 10 (FIGS. 2 and 3) by a conventional connection, e.g. welding or a preferable a pair of mating threaded components with one component being carried by each element. The internal slide member 10, in turn, is accommodated within an elongate bore of an elongate cylindrical control piston housing 12. The control piston housing 12 is provided with an elongate slot 14 along which the control lever 8 is allowed to move to and fro, along with the internal slide member 10, to actuate the sail apparatus 4 of the present invention as will be described in further detail below. A plurality of notches 13, 13', 13", e.g. at least two or three notches, are provided along the elongate slot 14 to lock or temporarily retain the control lever 8 at a desired set position.

A first end 16 of an operating rod 18 is connected to a rear end of the internal slide member 10 by a conventional connection, e.g. welding or a preferable a pair of mating threaded components with one component being carried by each element. A second opposed end 20 of the operating rod 18 is connected to a coupling bushing 22 by a conventional connection, e.g. welding or a preferable a pair of mating threaded components with one component being carried by each element.

The coupling bushing 22 is supported by a linkage track 24 (FIG. 4) having an elongate slot 26 extending along its length. The coupling bushing 22 is located within the elongate slot 26 is movable along the length of the elongate slot 26 in response to movement of the control lever 8.

A first end 30 of each of a pair of grid linkage arms 32 is connected, via an aperture, to a lower end of the coupling bushing 22, via a nut and bolt (not numbered). The second opposed end 34 of each one of the grid linkage arms 32 is coupled, via an aperture, to a sail grid 36 by a conventional pivotable connection, e.g. a nut and bolt (not numbered). The grid linkage arms 32 are coupled at an intermediate location along a length of the sail grid 36.

An upper elongate first (or leading) edge portion 37 of the sail grid 36 is pivotally mounted to the bicycle frame 7, via a first conventional pivotable mounting bracket 38, while the lower elongate first edge portion 37 of the sail grid 36 is also similarly pivotally mounted to a lower portion of the bicycle frame 7, via a another conventional pivotable mounting bracket 40. Due to this arrangement, the sail grid 36 is able to pivot relative to the bicycle frame 7 via the two pivotable mounting brackets 38, 40.

To summarize the operation of the adjustable bicycle sail apparatus of the present invention, when the sail apparatus 4 is in its fully closed or retracted position 13 (FIG. 2), each of the sail grids 36 is substantially parallel to the rear wheel 6 of the bicycle 2. That is, each of the sail grids 36 define a plane, and these planes are substantially parallel to a plane defined by the bicycle and rear wheel thereof. When the control mechanism is actuated to deploy the sails, trailing edges 58 of the sail grids 36 swing out and away from the bicycle 2, as shown in FIG. 3. In this state the sail apparatus 4 is in its fully opened or intermediate positions 13', 13", and each of the planes defined by the sail grids are positioned obliquely with respect to the plane defined by the bicycle.

As can be seen in FIG. 5, the sail grid 36 comprises an elongate solid or tubular member 39 which defines the outer perimeter of the sail grid 36 for a sail 42. At least one transverse horizontal support member 41 and at least one vertical support member 43 is provided for reinforcing the sail grid 36. The two transverse horizontal and vertical support members 41, 43 provide additional support to the sail 42 during use.

The sail 42 (FIG. 6) completely covers the sail grid 36 to capture the wind and assist with either propelling or providing additional resistance to the bicycle 2. The sail 42, for example, can be a covering comprising of a pair of opposed sheets of nylon material which are sewn together along their perimeters to form an elongate pocket which is open at one end 45 to allow the sail grid 36 to be received within the one end 45 between the pair of opposed sheets of nylon material. The 42 sail also includes a tab 47 having a releasable touch fastener 49, for example, for releasably mating with another matable releasable touch fastener 51 permanently fastened to an exterior surface of the sail 42. The sail 42 can have a slot or opening to allow the grid linkage arm 32 to be connected to the sail grid 36.

A first end 44 of the linkage track 24, located adjacent the control lever 8, is coupled to the bicycle frame 7 to secure the linkage track 24 relative to the remainder of the bicycle, via a conventional connector 53, e.g. a nut and bolt arrangement. A second end 46 of the linkage track 24 is connected to a wheel guard 48, via conventional connectors, e.g. a nut and bolt arrangement. The wheel guard 48 is an elongate U-shaped member which closely surrounds the rear half of the rear wheel 6 of the bicycle 2. A pair of opposed free ends 50, 52 of the wheel guard 48 are secured to the bicycle frame 7, via conventional connectors, e.g. a nut and bolt arrangement. It is to be appreciated that the first end 44 of the linkage track 24 and the free ends 50, 52 of the wheel guard 48 can be secured to the bicycle frame 7 via frame apertures which are typically provided for a mounting a conventional bicycle luggage rack to the bicycle 2. Alternatively, any necessary holes can be drilled into the frame 7 or conventional bicycle brackets can be utilized to mount the linkage track 24 and/or wheel guard 48 to the bicycle frame 7.

Figure 2:
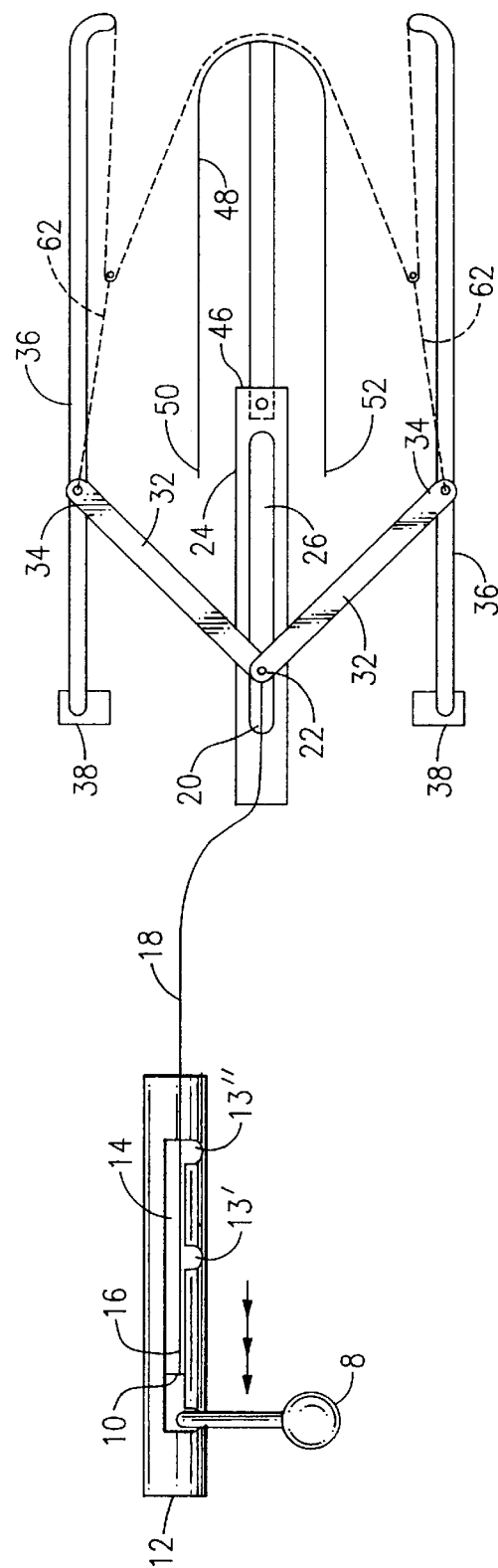
FIG. 2 is a diagrammatic top plan view of the sail apparatus, according to the present invention, with the two sails shown in their closed positions, as well as a the rear sail in its closed position.
Figure 3:
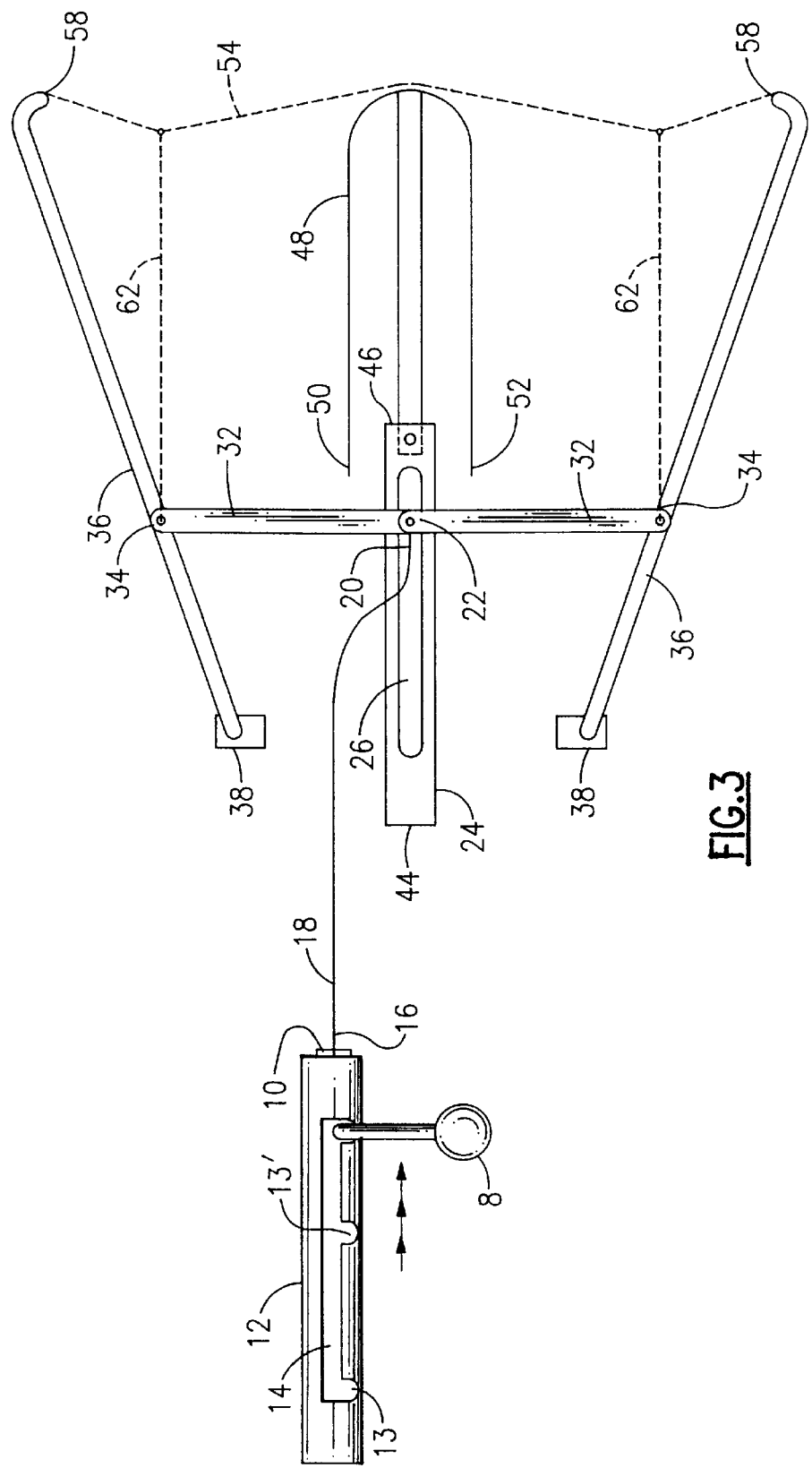
FIG. 3 is a diagrammatic top plan view of the sail apparatus, according to the present invention, with the two sail shown in their fully opened positions, and the rear sail in its fully extended position.
Figure 6:
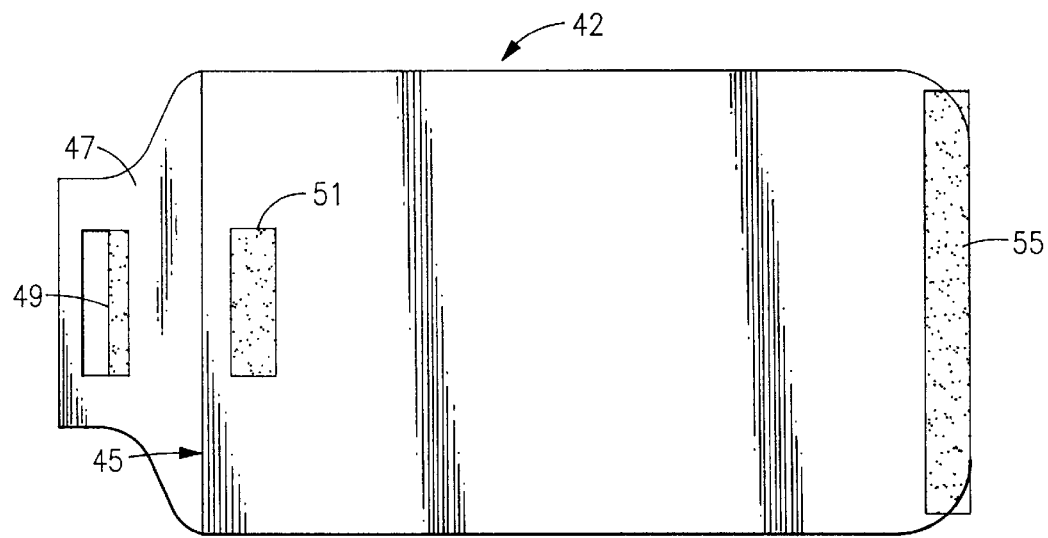
FIG. 6 is a diagrammatic front elevational view of one of the sails for attachment to one of the sail grids.
Figure 7:
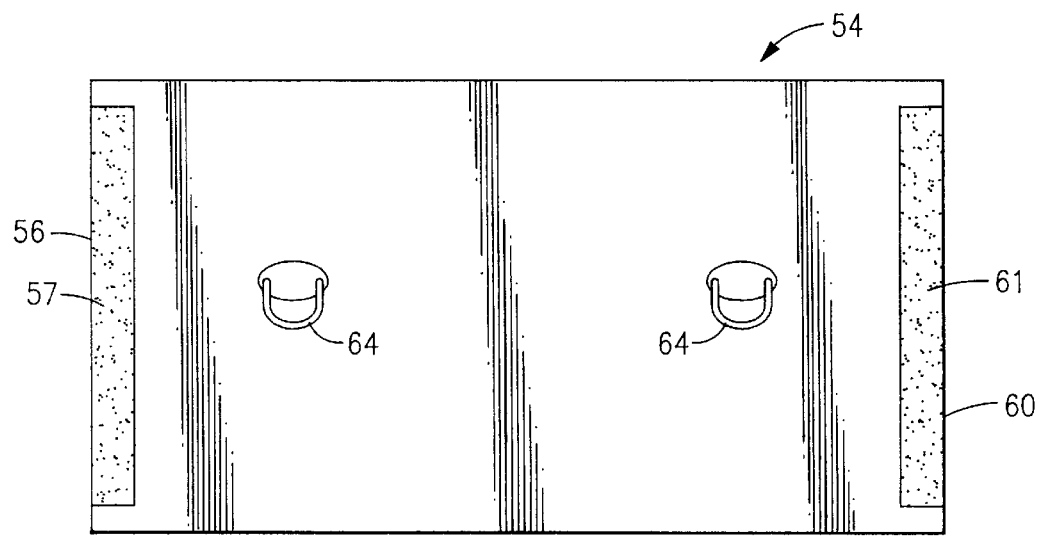
FIG. 7 is a diagrammatic front elevational view of the rear sail.

Turning now to FIGS. 2, 3 and 7, an optional rear sail 54, for use with the present invention, will now be described. A first elongate end 56 of, the rear third sail 54 is attached to an elongate second (or trailing) edge portion 58 of the sail grid 36, via a conventional first touch fastener 57 engaging a mating touch fastener 55 permanently secured to a rear edge portion of the sail 42. An opposed second elongate end 60 of the rear sail 54 is attached to the elongate second edge portion 58 of the second sail grid 36, via a second mating conventional touch fastener 61, engaging a mating touch fastener 55 permanently secured to a rear edge portion of the other sail 42. At least two elastic members 62, e.g. an elongate rubber band or member having a hook or latch member at each opposed end, interconnect intermediate portions of the rear sail 54 with the sail apparatus 4 and/or the bicycle 2. A first end of the elastic member 62 is connected to a ring 64, or some other conventional fastener, which is secured to the rear sail 54, while the opposite end of the elastic member 62 is connected to the sail apparatus 4 and/or the bicycle 2 via a hook or some other conventional fastener. As such attachment mechanisms are well known in the art, a further detailed description concerning the same is not provided.

When the rear sail 54 is in its fully closed position (FIG. 2), the elastic members 62 pull the rear sail 54 taut against the wheel guard 48 so that it will not bunch or gather up or get caught in the rear wheel 6 or the chain drive mechanism of the bicycle 2. If the control lever 8 is moved to the fully opened position, as can be seen in FIG. 3, the rear sail 54 is moved by the elongate second edge portions 58 of the sail grids 36 to its full opened position. This causes the elastic members 62 to be resiliently stretched and the rear sail 54 thereby takes a substantially planar configuration, as can be seen in FIG. 3.

The sail apparatus 4, according to the present invention, has three positions, e.g. a fully closed position 13', a fully open position 13", and an intermediate position 13'. It is to be appreciated that the number of positions for the sail apparatus 4 can vary from application to application. In addition, the overall size of the sails and the degree to which the sails open can be varied depending upon the wishes of the end user. The present inventors have found that a sail which opens to a position in which the elongate second (or trailing) edge portions 58 of the sail grids 36 are approximately 12–48 inches apart, most preferably about 36 inches apart, has proven acceptable.

The present invention is useful, both as a novelty item and as an apparatus for generating increased wind resistance during a workout, for example. The sail apparatus 4 is useful, for example, by a cyclist who is training for a race or who merely wants to increase or vary the wind resistance during his/her workout.

It is to be appreciated that the sails, according to the present invention, can be provided with one or more exterior pockets and/or with desired indicia or reflective material to improve the versatility and usefulness of the sail apparatus.

Further, it is not necessary to employ the rear sail 54 as the two side sails 42 will generally provide the user with sufficient resistance and/or assistance from the wind to during use of the present invention.

All of the components of the sail apparatus, except for the sails and the elastic members, are manufactured from a known plastic, e.g. polyethylene or polyester, or a metal such as aluminum, or some other material which is lightweight, durable and resistant to rust or oxidation.

Since certain changes may be made in the above described sail apparatus, without departing from the spirit and scope of the invention herein involved, it is intended that all of the subject matter of the above description or shown in the accompanying drawings shall be interpreted merely as examples illustrating the inventive concept herein and shall not be construed as limiting the invention.

Wherefore, I claim:

1. A sail apparatus for a bicycle, said sail apparatus comprising:
    a pair of sail grids, each of the pair of sail grids comprising a rigid, generally planar member defining a constant fixed sail surface area, and each of said pair of sail grids having at least one bracket for pivotally attaching a leading edge portion of only one of the generally rigid planar members to a frame of a bicycle, the at least one bracket defining a pivot axis for the attached sail grid, and the pivot axes for the pair of sail grids being spaced apart from one another and extending parallel to one another;
    a control mechanism for controlling the position of the pair of sail grids, when attached to a frame of the bicycle;
    a pair of grid linkage arms, each one of the linkage arms interconnecting the control mechanism with one of the pair of sail grids for controlling a position of the pair of sail grids; and
    each of the pair of sail grids being positionable between a closed position, where the pair of sail grids extend substantially parallel to one another and a longitudinal axis of the sail apparatus, and a fully opened position where the pair of sail grids are located oblique with respect to the longitudinal axis of the sail apparatus.

2. The sail apparatus according to claim 1 in combination with a bicycle which has a bicycle frame, wherein the leading edge of each of said pair of sail grid is pivotally mounted to a bicycle frame via a pair of spaced apart pivotable brackets.

3. The sail apparatus according to claim 2, wherein:
    a control lever is coupled to a first end of an operating rod and controls operation of the control mechanism; and
    a second end of the operating rod is pivotally coupled to a first end of each of the grid linkage arms, and a second end of each one of the grid linkage arms is pivotally connected to a top portion of each one of the pair of sail grids.

4. The sail apparatus according to claim 3, wherein the operating rod is coupled to the linkage arms via a coupling bushing, the coupling bushing is supported by a linkage track having an elongate slot therein, and the linkage track is connected to and supported by a bicycle frame, and the coupling bushing is slidably disposed within the elongate slot and has at least one projection extending through the slot for coupling to the operating rod and pivotally coupling to the linkage arms;
    whereby for deploying the sail mechanism the control lever is moved in a rearward direction and the operating rod slides the coupling bushing along the elongate slot in the linkage track causing the linkage arms to pivot, via the first ends pivotally connected to the coupling bushing, out and away from one another thereby causing the pair of sail grids, via the pivot couplings between the sail grids and the linkage arms and via the pivot bracket connections between the leading edges and the bicycle frame, to become obliquely oriented with respect to the longitudinal axis of the sail apparatus.

5. The sail apparatus according to claim 1, wherein a removable fabric sail covers each one of the pair of sail grids, and the removable fabric sail is substantially impermeable by air.

6. The sail apparatus according to claim 1, wherein the sail apparatus further includes a wheel guard, the wheel guard is a U-shaped member which has a pair of opposed free ends located for attachment to a frame of a bicycle and an intermediate portion of the U-shaped member is connected to the control mechanism.

7. The sail apparatus according to claim 1, wherein a control lever is coupled to said control mechanism to control operation of the control mechanism.

8. The sail apparatus according to claim 7, wherein the control mechanism is coupled to the pair of grid linkage arms via an operating rod.

9. The sail apparatus according to claim 8, wherein a first end of the operating rod is connected to a slide member, and the slide member is accommodated within an external piston housing and slidable therealong; and
    the piston housing has an elongate slot therein and the control lever extends through the elongate opening and is connected to the slide member for facilitating movement of the slide member along the elongate slot.

10. The sail apparatus according to claim 8, wherein the elongate slot is provided with a plurality of notches therealong to facilitate retaining the control lever in a desired set position.

11. The sail apparatus according to claim 9, wherein the elongate slot has at least three notches provided therein to facilitate retaining the control lever in one of three desired set positions.

12. The sail apparatus according to claim 1, wherein the sail apparatus further includes a rear sail, and opposed ends of the rear sail are connected to the trailing edge portions of the pair of sail grids.

13. The sail apparatus according to claim 12, wherein a pair of elastic members are secured to the rear sail at locations intermediate the opposed ends, and the opposed ends of the elastic members are attachable to a frame of a bicycle.

14. The sail apparatus according to claim 1, wherein each of the pair of sail grids comprises a fixed rigid perimeter support member.

15. The sail apparatus according to claim 14, wherein each the pair of sail grids has at least one transverse horizontal support member and at least one vertical support member for reinforcing each of the pair of sail grids.

16. The sail apparatus according to claim 1, wherein at least one of the control mechanism, the pair of linkage arms, and the pair of sail grids are manufactured from a metal.

17. The sail apparatus according to claim 1, wherein the trailing edges of the pair of sail grids are about between twelve and forty-eight inches apart from one another when the pair of sail grids are in the fully opened position.

18. The sail apparatus according to claim 1 wherein the control mechanism comprises:
   a control piston housing with an elongate slot therein;
   a slide member is accommodated within the control piston housing and slidable therealong;
   a control lever extends through the elongate opening in the control piston housing and is connected to the slide member for facilitating movement of the slide member along the elongate slot; and
   an operating rod with a first end and a second end, the first end of the operation rod is connected to the slide member and the second end is pivotally connected to the pair of grid linkage arms.

19. A sail apparatus in combination with a bicycle having a frame, the sail apparatus comprising:
   a pair of sail grids, each of the pair of sail grids comprising a rigid, generally planar member defining a constant fixed sail surface area, and a leading edge of each of said pair of sail grids being pivotally mounted to the bicycle frame via a pair of spaced apart pivotable brackets, the pair of spaced apart pivot brackets each defining a pivot axis for the attached sail grid, and the pivot axes for the pair of sail grids being spaced apart from one another and extending parallel to one another; and the pair of sail grids being positionable between a closed position, where the pair of sail grids extend substantially parallel to one another and a longitudinal plane defined by the bicycle, and a fully opened position, where the pair of sail grids are located obliquely with respect to the plane defined by the bicycle;

a control mechanism for controlling the position of the pair of sail grids attached to the frame of the bicycle; and a pair of linkage arms, each one of the linkage arms interconnecting the control mechanism with one of the pair of sail grids for controlling a position of the sail grids;

a removable fabric sail covering each one of the pair of sail grids, and the removable fabric sail being substantially impermeable by air; and the sail apparatus further including a wheel guard, the wheel guard being a U-shaped member which has a pair of opposed free ends attached to the frame of the bicycle and an intermediate portion of the U-shaped member being connected to the control mechanism.

20. A method of utilizing wind while operating a bicycle, the method comprising the steps of:
   providing a pair of sail grids which each support a sail, each of the pair of sail grids comprising a rigid, generally planar member defining a constant fixed sail surface area;

pivotally attaching a leading edge portion of each of the sail grids to a frame of a bicycle via at least one bracket, defining a pivot axis of the attached sail grid by each of the at least one brackets, spacing the pivot axes for the sail grids apart from one another and having the pivot axes extends parallel to one another;

interconnecting an intermediate portion of each one of the sail grids to a control mechanism, via a pair of linkage arms, to control operation of the pair of sail grids; and manipulating the control mechanism to control a position of the pair of sail grids during operation of the bicycle;

allowing the pair of sail grids to be positionable between a closed position, where the sail grids extend substantially parallel to a longitudinal plane defined by the bicycle, and a fully open position, where the sail grids are positioned obliquely with respect to the plane defined by the bicycle.

* * * * *